Sept. 25, 1928.                  R. T. OSBORN                  1,685,501
PROCESS FOR RECOVERY OF VAPORS
Filed July 11. 1922
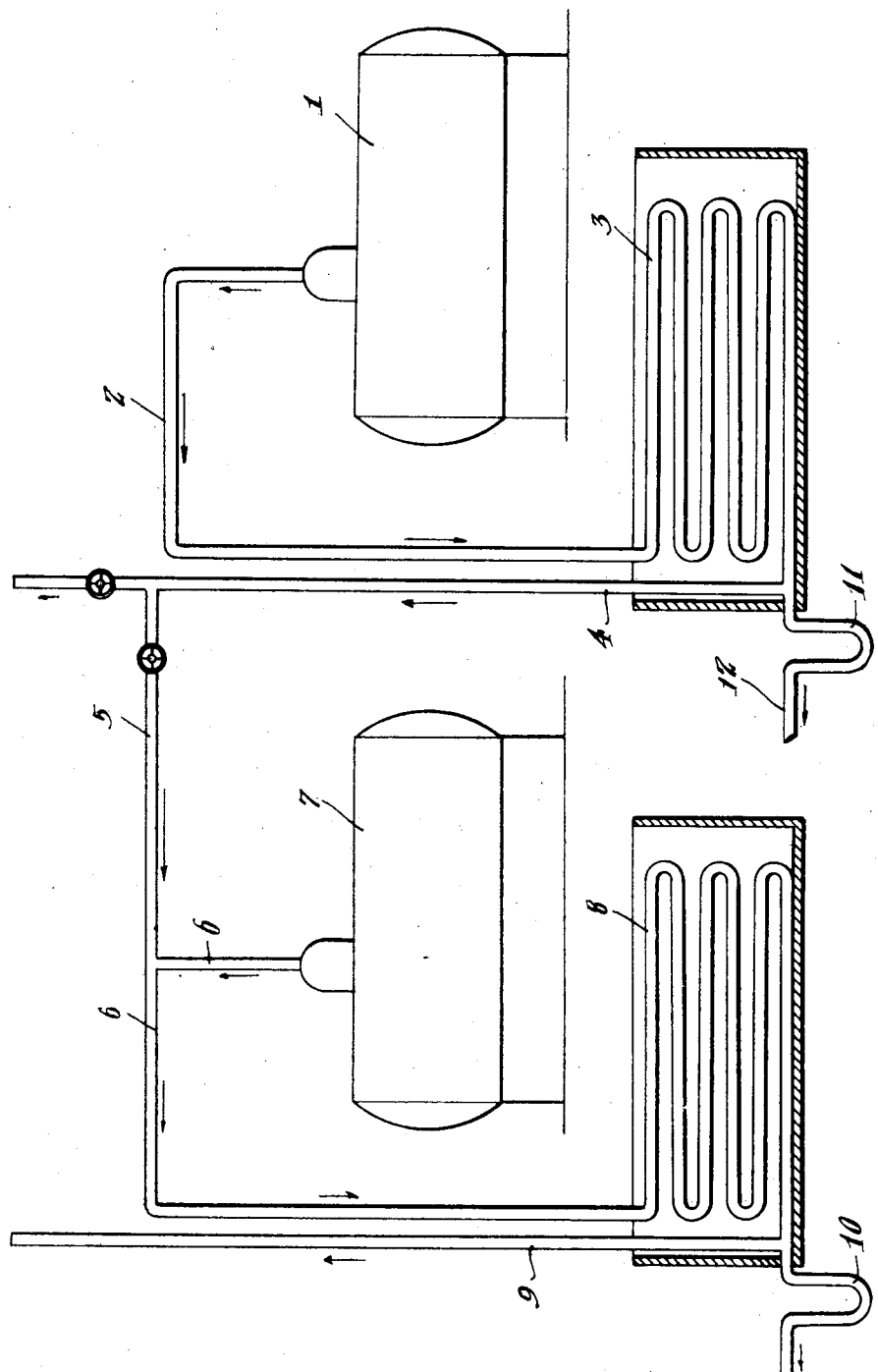
Inventor
Robert T. Osborn
By Lyon & Lyon attys.

Patented Sept. 25, 1928.

1,685,501

UNITED STATES PATENT OFFICE.

ROBERT T. OSBORN, OF RICHMOND, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

PROCESS FOR RECOVERY OF VAPORS.

Application filed July 11, 1922. Serial No. 574,183.

This invention relates to the recovery of light hydrocarbon oils in vapor form, which heretofore have frequently escaped as lost or waste gases from the vent pipes of distilling apparatus, or units, or escaped from treating equipment such as agitators or from other apparatus, or from producing oil wells.

While heretofore a number of processes have been devised by which these gases may be more or less efficiently recovered, all such processes require more or less elaborate equipment, entailing large installation cost with the accompanying operating and maintenance cost. I have discovered that these light petroleum vapors which are normally not condensed under atmospheric conditions of temperature and pressure, may be readily recovered by passing such vapors into the vapors of relatively higher boiling point fractions and then condensing the resultant intermixed or commingled vapors. By thus passing such lost or waste vapors into heavier vapors I am able to avoid the necessity for expensive or extensive equipment for the recovery thereof and to avoid any material cost of additional operating expense. By thus passing such light vapors into the vapors of relatively higher boiling point fractions, evidently the vapors combine and the combined vapors are readily condensible.

In fact, I have found that by so introducing these light gases or vapors into the vapors of the relatively higher boiling point fractions, a more complete recovery of the gases is obtained than is practical to obtain by present known processes of scrubbing with liquid oils.

After the foregoing preliminary explanation my process will be more readily understood from the accompanying drawings and the following detailed description, showing a preferred embodiment of my invention for recovery of gases escaping from the vent pipes of a distilling unit.

1 is a still from which light petroleum vapors are distilled off, passing through vapor pipe 2 to a condenser 3. A vent pipe 4 is provided at the end of the condenser 3 through which the uncondensed vapors pass. The condenser 3 is provided with a trap 11 so that only the condensed liquid passes off through the line 12. A second still 7 is operating simultaneously with the still 1 but producing vapors of relatively higher boiling point. This still is connected by a vapor line 6 to its condenser 8. From the vent pipe 4 of the first still is provided a connection 5 to said vapor line 6 of the second still whereby the escaping gases from the first still are introduced and commingled with the relatively higher boiling point vapors of the second still. These vapors then pass through the condenser 8 where substantially all of the mixed vapors are condensed. The condenser 8 is provided with a vent pipe 9 and a trap 10. It will be found that the uncondensed gases from the still 1 have been substantially all condensed with the condensate from the still 7. In actual practice in the distillation of petroleum oil I have found that by thus introducing the gases from the still 1 which were not condensed under atmospheric conditions of temperature and pressure, when introduced into or combined with the relatively higher boiling point vapors from the still 7, are substantially all condensed in the condensation of the relatively higher boiling point vapors from the still 7.

Similarly, the waste gases from various treatments at the refinery may thus be introduced into the relatively higher boiling point vapors of distillation operation and thus recovered. Certain light vapors which occur in producing wells may also be thus recovered.

I am aware that vapors have been mixed together in the prior art for such purposes as to function in a cracking operation, either to retard the formation of fixed gases in the cracking operation, or to cause some exchange of hydrogen content between the vapors, or to combine with the liquid of the pressure still. Also that certain vapors have been mixed together and then heavily compressed to form blended products. The present process is to be distinguished from such prior processes in that there is no chemical rearrangement of the molecules of the mixed vapors as the vapors are below a cracking temperature or pressure, moreover the vapors are condensed at substantially the pressure of the vaporization of the relatively higher boiling point oils and thus without heavy compression.

I claim:

1. In the distillation of petroleum oil the method of recovering vapors substantially uncondensible at atmospheric temperature and pressure, comprising passing such vapors from the condenser of one distilling unit into the vapors from a second distilling unit operating below a cracking temperature and pressure to convert relatively higher boiling point oil into vapor, and directly condensing the resultant commingled vapors at substantially the pressure at which the relatively higher boiling point oils are vaporized.

2. A process of recovering escaping or waste petroleum gases which are by themselves substantially uncondensible at atmospheric pressure and temperature, which consists in passing such gases unaccompanied by vapors condensible at or below the pressure and temperature at which said gases can be condensed, into vapors from a distilling unit operating below cracking temperature and pressure to convert higher boiling point oil into vapors which are condensible at atmospheric temperatures and pressures and which vapors contain substantially no constituents of which said gases are composed, thereby creating a vapor condition such that substantially all of said vapors and gases can be condensed at atmospheric temperatures and pressures, and condensing the said gases together with the said vapors, said gases being retained in the same molecular state from the time of mixing until after their condensation.

Signed at Richmond, Calif., this 30th day of June, 1922.

ROBERT T. OSBORN.